United States Patent [19]

Kuehnle

[11] 4,264,199

[45] Apr. 28, 1981

[54] UNITARY OPTICAL SYSTEM MOUNTING COMPONENT FOR IMAGING APPARATUS

[75] Inventor: Manfred R. Kuehnle, Lexington, Mass.

[73] Assignee: Coulter Systems Corporation, Bedford, Mass.

[21] Appl. No.: 11,308

[22] Filed: Feb. 12, 1979

[51] Int. Cl.³ ...................... G03B 27/70; G03G 15/04

[52] U.S. Cl. ...................................... 355/66; 355/16

[58] Field of Search .................. 355/3 BE, 11, 16, 57, 355/60, 66, 65

[56] References Cited

U.S. PATENT DOCUMENTS

| | | | |
|---|---|---|---|
| 2,940,358 | 6/1960 | Rosenthal | 355/66 |
| 3,776,629 | 12/1973 | Ogawa | 355/16 X |
| 3,796,488 | 3/1974 | Tanaka et al. | 355/16 |
| 3,848,996 | 11/1974 | Goding | 355/66 X |
| 3,888,577 | 6/1975 | Meyer | 355/16 X |
| 3,891,315 | 6/1975 | Kolibas | 355/66 X |
| 3,936,179 | 2/1976 | Murakami | 355/11 |

*Primary Examiner*—Donald A. Griffin

*Attorney, Agent, or Firm*—Silverman, Cass & Singer, Ltd.

[57] ABSTRACT

A unitary optical system mounting component for imaging apparatus comprising a molded basket-like rigid support member of plastics material having a pair of planar opposite walls inclined at equal but opposite directed angles and a vertical partition located centrally between said inclined walls. A pair of planar mirrors is securable each to one of said inclined walls respectively. The vertical partition is provided with a mounting for accommodating a lens system. When installed in the support, the optical system is aligned properly with no further adjustments required. The support is capable of snap-in installation, say in an imaging apparatus capable of accommodating same.

32 Claims, 3 Drawing Figures

UNITARY OPTICAL SYSTEM MOUNTING COMPONENT FOR IMAGING APPARATUS

BACKGROUND OF THE INVENTION

This invention relates to a unitary mounting device for an optical system comprising a pair of inclined mirrors and a lens system positioned between the pair of inclined mirrors.

Electrophotographic imaging apparatus such as copying machines are well known in the art. Generally speaking, these machines include an electrophotographic member which is transported past or through a series of work stations. The work stations usually include a charging station at which a uniform charge is placed on the photoconductive surface of the electrophotographic member, an exposure station at which the charged surface is exposed to a light image of the document to be copied so as to form thereon a latent electrostatic image, a developing station where the latent image is developed or made visible through the application of finely divided toner particles that adhere to the surface according to the latent image configuration, and a transfer station where the toned image is transferred to a secondary carrier material such as paper. In certain known modifications of these machines, one or more of the above stations are eliminated.

The electrophotographic member may be in the form of a plate, a drum or an endless belt. For high speed copying machines it has been found advantageous to employ an electrophotographic member in the form of an endless belt mounted on a plurality of rollers and to expose the electrophotographic member to an image of the document to be copied at a location where the belt is in a flat condition. The image of the document is projected onto the belt through some type of optical projection system.

The optical projection system may comprise a single lens system but usually includes in addition to the lens system one or more mirrors, the number and location of the mirrors depending on the physical location of the copy platen on which the document to be copied is placed relative to the exposure station where the latent image is to be formed. Normally, each one of the optical components making up the optical system is mounted on a separate support member which is fixed to the frame of or other part of the machine and precisely positioned so that it is in optical alignment with each one of the other optical components.

Adjustments must be made to each of the components of the optical system upon installation in the imaging apparatus, requiring individual manipulations subsequent to mounting for proper focus and alignment of the optical system insitu.

The optical component systems heretofore available require the allocation of considerable area within the cabinet housing for receiving the imaging apparatus, thus limiting greatly the availability of compact reduced bulk structures capable of desk-top utility.

Applicant has discovered that if the imaging can be effected upon flat portion of a belt located in a plane parallel to the plane of the copy platen of the apparatus, where the document to be copied is placed, and the surface carrying the formed latent image faces downward at the location of imaging, the optical system for projecting an image of said document to the receiving surface portion may comprise a "folded" arrangement including a pair of 45° planar mirrors. In order to take advantage of such arrangement, a mounting or support structure therefor must be supplied. Availability of such mounting or support structure would enable material reduction of the area required to accommodate the optical system in the imaging apparatus housing, and hence, result in substantial reduction in the size of the overall unit.

Further, provision of such mounting component could enable assembly of the imaging unit from separately manufactured modular components, same capable of facile assembly and disassembly for repair, replacement or exchange of components for varied imaging purposes, with both economy and yet maintenance of accuracy.

SUMMARY OF THE INVENTION

A self-contained optical system mounting component for imaging apparatus formed of an integral, rigid, basket-like support having a pair of inclined opposite planar walls and an intermediate partition, the angle of inclination of said planar walls being equal but in opposite directions one relative to the other. A pair of planar mirrors is mounted, one upon the inner surface of each inclined wall in facing relationship. The intermediate partition is provided with means to accommodate a lens system positioned intermediate said mirrors. When installed, the optical system is aligned correctly and the unit is readily incorporated in the imaging apparatus. Preferably, the basket-like support is formed as a unitary molded structure of plastics material. Means are provided to facilitate assembly of the component as a unit with other preassembled units to complete assembly of the imaging apparatus.

DESCRIPTION OF THE PREFERRED EMBODIMENTS

Figure 1:
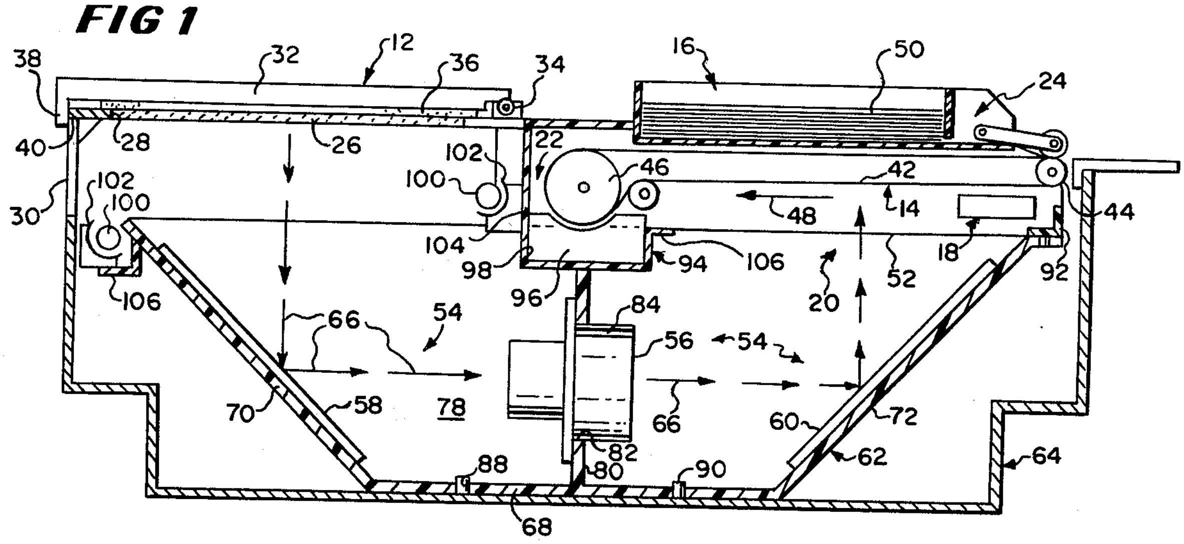
FIG. 1 is a sectional diagrammatic representation of an electrophotographic copying machine including the optical system mounting component of the invention herein.

Referring to the drawings, in FIG. 1 there is illustrated an electrophotographic copying machine designated generally by reference character 10 and including a document mounting platen assembly 12, an electrophotographic imaging assembly 14, including transfer medium supply station 16, a charging station 18, an exposure station 20, a toning or development station 22, and a transfer station 24.

The document mounting platen assembly 12 includes a transparent planar member 26 suitably seated in access opening 28 of housing 30 and a suitable platen cover 32 is mounted for pivotal movement on brackets 34 whereby to sandwich master document 36 between the member 26 and cover 32. Suitable catch means 38 are provided along the free edge of the platen cover 32 to engage the corner 40 of the housing 30.

The electrophotographic imaging assembly includes an electrophotographic belt 42 mounted for rotational movement on a pair of rollers 44 and 46, roller 46 being a driven roller coupled to a drive motor (Not shown).

The belt 42 is arranged to rotate in the direction shown by arrows 48 sequentially past the series of work stations, 18, 20, 22 and 24.

As used throughout the specification and claims hereof, the term "electrophotographic belt" is used to describe an endless belt or web of which at least a portion is electrophotographic in character, that is, made up of a portion having a photoconductive coating on a conductive substrate.

The belt 42 first is directed to charging station 18 where the photoconductive coating surface coating of the belt is charged uniformly. The belt 42 next is directed to the exposure station 20 where the charged surface is exposed to a light iamge of the master document 36 forming thereby a latent electrostatic image. The belt 42, carrying the latent image, next is directed to the development or toning station 22 where the latent electrostatic image is developed. The belt 42 then travels to the transfer station 24 where the toned image is transferred to a sheet of paper 50 or other material from the supply station 16.

The exposure station 20 is located along a planar reach 52 of belt 42, the rollers 44 and 46 being positioned so that the planar reach 52 is in a plane parallel to the top surface of copy platen 26 on which the master document 36 is placed. The belt 42 is arranged on the rollers 44 and 46 so that the photoconductive coating of said belt 42 is on the outer circumference of the belt and faces downward at the exposure station 20.

The light image is of the master document 36, and is projected from the copy platen 20 onto the photoconductive coating of the belt at the exposure station 20 by means of an optical projection system 54.

The optical projection system 54 includes in optical alignment, a lens system 56 and a pair of 45° planar mirrors 58 and 60. The lens system 56 is positioned mid-way between said planar mirrors 58 and 60. Lens system 56 and planar mirrors 58, 60 are mounted on a mounting or support 62 which is seated within the machine housing 64 at a location such that the image of document 36 is projected to the belt 42 along the path indicated by arrows 66.

Figure 2:
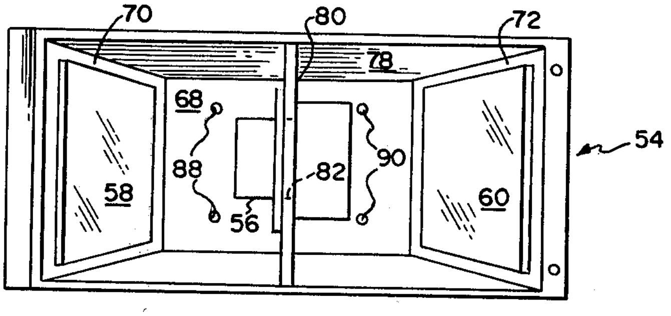
FIG. 2 is a plan view of the optical system mounting component shown in section in FIG. 1.
Figure 3:
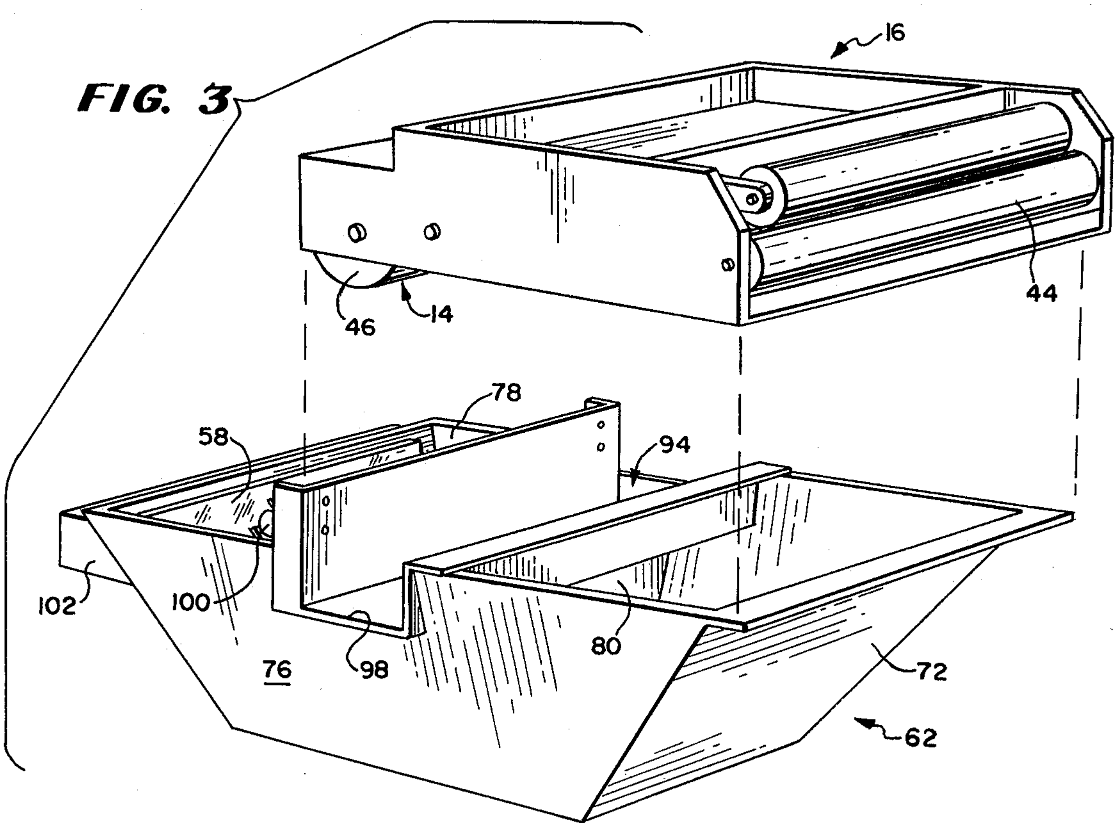
FIG. 3 is an exploded perspective representation of portions of the copying machine of FIG. 1 diagrammatically illustrating the partial assembly thereof.

The mounting 62 which is shown in plan view in FIG. 2, is a basket-like rigid member preferably molded as an integral member out of plastics material. The mounting 62 includes a bottom wall or floor 68 and a pair of outwardly inclined planar end walls 70 and 72 at opposite ends of the floor 68. Connecting walls 74 and 78 bridge the end walls 70 and 72, and an upright partition 80 extends vertically from said floor 68. End walls 70 and 72 are inclined in opposite directions at an angle of 45° relative to the floor 68. Planar mirror 58 is mounted on the inner surface of end wall 70 and planar mirror 60 is mounted on the inner surface of end wall 72 by conventional means such as adhesive cement. Partition 80 is located midway between end walls 70 and 72. The lens system 56 is mounted on the partition 80 through an opening 82 and rigidly is fixed thereat by any suitable means (not shown). The lens system 56 may be encased in a flanged cylindrical housing 84 and the dimension of opening 82 may be selected to provide a frictional engagement with a portion of the cylindrical housing 84.

Floor 68 may include a plurality of mounting apertures 88 cooperative with studs 90 provided on the floor of the machine housing 64 to effect a snap-in connection therewith. Connecting walls 74 and 78 are outwardly inclined, so as to seat better in the machine housing, especially if support flanges 92 are provided in the machine housing 64. Such flanges likewise would be provided with suitable apertures cooperative with projections, studs or the like provided on the machine. Obviously, projections could be provided on the flanges for suitable receipt in apertures provided on the machine housing. Any other suitable fasteners may be utilized with equivalent result.

One of the principal advantages of the invention is that the two mirrors 58 and 60 and the lens system 56 can be mounted with facility on the mounting 62 with the resulting optical alignment assured and before the mounting component is installed within the machine housing 30. The mounting of the respective mirrors onto the respective end walls is effected with the mirrors parallel to the said end walls respectively.

The height of the partition 80 is selected to be less than the overall height of the basket-like support 62 so that a flanged well 94, provided as a part of the imaging assembly for holding liquid toner or for supporting a toner containing cartridge 96, may rest upon the upper edge of the partition 80. A notch 98 may be provided in each wall 76, 78 opening to the upper edge to receive said well 94. Lamp 100 and reflector 102 therefor may be accommodated secured to said well 94.

A pair of flanges 104 and 106 are formed respectively along the well 94, flange 106 having an L shaped cross-sectional configuration. Flange 104 mounts the lamp and reflector and flange 106 is employed to seat the housing carrying the electrophotographic operating stations.

The basket-like optical system mounting component 62 preferably is molded as a unit and the mirrors and lens system installed thereafter. The assembled unit may be assembled at one location and installed in the imaging machine in situ at the place of installation, or may be assembled to the copying machine along with the other component assemblies.

The unit has particular advantage in that the interior volume of the housing 64 particularly its vertical dimension can be materially reduced over those of conventional copying machines in view of the angular disposition of the mirrors of said optical system. This optical arrangement may be described as a folded optical system. If a different mirror arrangement having the mirror pair disposed at angles other than 45°, is required, the mounting component 62 can be dislodged easily from its snap-in connection with the housing 64 and replaced with a similar structure having its respective mirror supporting walls formed with a different angular inclination.

Additional supporting flanges also may be provided in the molded structure adjacent the border of the notched areas 98 so as to provide greater support for the well 94 seated bridging the pair of connecting walls.

Other modifications and variations of the invention may be apparent to one skilled in the art without departure from the spirit and scope of the invention as defined in the appended claims.

What I claim is:

1. An optical system mounting component for imaging apparatus wherein an image is projected from an object plane to an image plane and comprising an integral basket-like rigid open-top support member having a pair of outwardly inclined unitary opposite end walls, bridging means connecting said end walls and an upwardly extending partition disposed between said end walls, said end walls being inclined at equal but oppositely directed angles and mirror means secured thereto in fixed angularly facing relationship one to the other, said partition including means for supporting a lens system thereon for directing the image from one of said mirror means to the other and being bodily installable as a unit in said imaging apparatus and in fixed relationship therein.

2. The mounting component as claimed in claim 1 in which there is a planar floor and the partition is disposed normal to said floor midway between said opposite end walls.

3. The mounting component as claimed in claim 1 in which said bridging means comprise outwardly angularly inclined walls.

4. The mounting component as claimed in claim 1 in which said end walls and mirror means seated thereon are inclined at angles of 45°.

5. The mounting component as claimed in claim 1 in which said support member is formed as a plastic molded unitary member.

6. The mounting component as claimed in claim 1 in which the height of the partition is less than the overall height of the inclined walls taken vertically.

7. The mounting component as claimed in claim 1 in which said walls have outwardly extending border flanges unitary therewith and means provided along said border flanges to establish a snap-in connection with said imaging apparatus.

8. An optical system mounting component for imaging apparatus wherein an image is projected from an object plane to an image plane and comprising an integral basket-like rigid support member having a pair of outwardly inclined opposite end walls, connecting wall means connecting said end walls and an upwardly extending partition disposed between said end walls, said end walls being inclined at equal but oppositely directed angles and adapted to seat mirror means secured thereto in angularly facing relationship one to the other, said connecting wall means include matched cut-out portions for accommodating a conformingly shaped well disposed transverse said support member and capable of receiving liquid toner therein.

9. An optical system mounting component for imaging apparatus wherein an image is projected from an object plane to an image plane and comprising an integral basket-like rigid support member having a pair of outwardly inclined opposite end walls, connecting wall means joining said end walls and an upwardly extending partition disposed between said end walls, said end walls being inclined at equal but oppositely directed angles and mirror means secured thereto in angularly facing relationship one to the other, said connecting walls being notched to provide matched mounting portions for accommodating a well arranged transverse said support member and capable of receiving a toner cartridge therein for dispensing liquid toner.

10. In combination, an optical system for use in electrophotographic imaging apparatus and an optical system mounting component comprising a unitary, open-topped basket-like rigid support having a pair of outwardly inclined end walls and a pair of opposite connecting walls, means on said end walls for receiving secured thereto a pair of planar mirrors secured on said end walls in equal but oppositely directed angular facing relationship, an upstanding partition seated between said end walls bridging said connecting walls and arranged normal thereto, an optical lens, and means on said partition for mounting said lens thereto whereby said mirrors and lens when mounted are aligned optically properly for installation as a unit bodily into the imaging apparatus in fixed relation therein.

11. The combination as claimed in claim 10 and means on said component cooperative with means interior of said imaging apparatus for effecting a snap-in connection for installation therewithin.

12. The combination as claimed in claim 11 in which said snap-in connection is releasable.

13. The combination as claimed in claim 10 in which the connecting walls include cut-out means for mounting a dish-like well transverse said mounting component adjacent the upper edge thereof and nested at least partially within said basket-like support yet noninterferent with said optical system.

14. The combination as claimed in claim 10 in which lamp means and reflector means therefor are mounted transverse said connecting walls and adjacent said partition.

15. The combination as claimed in claim 10 in which said support is a unitary plastics molded member.

16. An electrostatic imaging apparatus comprising a folded optical system component comprising a dished rigid unitary basket-like mounting member having a pair of outwardly inclined end walls and opposite wall means connecting said end walls, a pair of facing planar mirrors secured to the interior surface of said end walls, upstanding partition means intermediate said end walls and in a plane perpendicular to said connecting means, and a lens assembly mounted to said partition means, said mirrors and lens assembly being optically aligned, said mirrors and inclined end walls being arranged at the same but oppositely directed fixed angles said system capable of installation as a unit bodily into said imaging apparatus in a fixed position therein.

17. The apparatus as claimed in claim 16 in which said lens system includes at least one cylindrical housing and said partition means includes at least one circular opening adapted to receive said cylindrical housing therein in frictional engagement.

18. The apparatus as claimed in claim 16 in which said mirrors and inclined end walls are disposed at a 45° angle.

19. The apparatus as claimed in claim 16 in which said mounting member is formed as a unitary molded formation of plastics material.

20. An electrostatic imaging apparatus comprising a folded optical system component including a dished rigid mounting member having a pair of outwardly inclined end walls and wall means connecting said end walls, upstanding partition means intermediate said end walls and in a plane perpendicular to said connecting means, said folded optical system comprising a pair of facing planar mirrors secured to the interior surface of said end walls and a lens assembly mounted to said partition means, said mirrors and lens assembly being optically aligned, said mirrors and inclined end walls being arranged at the same but oppositely directed angles, said dished mounting member being integral and said connecting wall means includes opposite aligned cut-out portions having a configuration suitable for receiving a dish shaped wall body of conforming cross-section therein and positioned transverse said component.

21. The apparatus as claimed in claim 20 and reflector means and lamp means associated therewith.

22. A mounting device for an optical system for use in projecting an image from an object plane to an image plane, the optical system comprising in optical alignment a lens system and a pair of inclined planar mirrors, the lens system being positioned between the pair of inclined planar mirrors, the mounting device comprising a single unitary rigid member having a floor, a pair of outwardly inclined planar end walls at opposite ends of the floor, each one of the end walls being adapted to receive and hold one of the planar mirrors secured to each one of said end walls in opposite facing relationship, an intermediate partition extending upward from the floor at a location between the two end walls, and means capable of receiving the lens system for mounting on said intermediate partition said device installable as a unit bodily below said object and image planes.

23. The mounting device of claim 22 and wherein the partition is unitary with the rigid member.

24. The mounting device of claim 23 and wherein the end walls are outwardly inclined at equal but oppositely directed angles relative to the floor.

25. The mounting device of claim 24 and wherein each one of the end walls is outwardly inclined at an angle of 45° relative to the floor.

26. The mounting device of claim 22 and wherein the unitary rigid member further includes connecting walls joining said end walls.

27. The mounting device of claim 26 and wherein the connecting walls are outwardly inclined.

28. The mounting device of claim 26 and wherein the end walls and connecting walls define together a basket-like configuration.

29. The mounting device of claim 22 and wherein the intermediate partition extends upward at an angle of 90° relative to the floor and midway the end walls.

30. The mounting device of claim 22 and wherein the unitary rigid member is made of metal.

31. The mounting device of claim 22 and wherein the intermediate partition is located mid-way between the two end walls.

32. For use in an electrophotographic imaging machine having an image of a document projected from a copy platen of the machine to the photoconductive surface of an electrophotographic belt substantially parallel thereto and offset therefrom while said photoconductive surface is located in an exposure plane interior of said machine, a folded optical assembly comprising:

(a) a unitary rigid member having a floor, a pair of facing planar end walls extending outward from opposite ends of the floor and inclined upward in generally equal opposite directions from said bottom wall at angles of substantially 45°, (b) a planar mirror fixedly secured to the planar inside surface of each end wall, (c) and an intermediate partition extending vertically upward from the floor, said partition having aperture means formed in said partition capable of receiving and holding a lens system, (d) a lens system mounted in said aperture means, said mirrors and lens system being optically aligned when installed on said rigid member, said folded assembly being installable as a unit bodily into said imaging machine below said image and exposure planes.

* * * * *